US010447513B2

(12) United States Patent
Kundargi et al.

(10) Patent No.: US 10,447,513 B2
(45) Date of Patent: Oct. 15, 2019

(54) COMMON PHASE ERROR (CPE) COMPENSATION FOR FREQUENCY DIVISION MULTIPLEX (FDM) SYMBOLS IN WIRELESS COMMUNICATION SYSTEMS

(71) Applicant: National Instruments Corporation, Austin, TX (US)

(72) Inventors: Nikhil U. Kundargi, Austin, TX (US); Achim Nahler, Dresden (DE)

(73) Assignee: National Instruments Corporation, Austin, TX (US)

( * ) Notice: Subject to any disclaimer, the term of this patent is extended or adjusted under 35 U.S.C. 154(b) by 20 days.

(21) Appl. No.: 15/855,148

(22) Filed: Dec. 27, 2017

(65) Prior Publication Data

US 2018/0198651 A1   Jul. 12, 2018

Related U.S. Application Data

(60) Provisional application No. 62/443,226, filed on Jan. 6, 2017.

(51) Int. Cl.
*H04J 1/00* (2006.01)
*H04L 27/01* (2006.01)
(Continued)

(52) U.S. Cl.
CPC ............. *H04L 27/01* (2013.01); *H04J 11/00* (2013.01); *H04L 25/0204* (2013.01);
(Continued)

(58) Field of Classification Search
None
See application file for complete search history.

(56) References Cited

U.S. PATENT DOCUMENTS 7,283,599 B1 * 10/2007  Herbig ................... H04L 27/38
                                                          375/321
8,325,755 B2    12/2012  Lee et al.
(Continued)

FOREIGN PATENT DOCUMENTS

| WO | WO2017084235 A1 | 5/2017 |
| WO | WO2017192889 A1 | 11/2017 |
| WO | WO2018026220 A1 | 2/2018 |

OTHER PUBLICATIONS

QUALCOMM. "Beam Management for NR." R1-1705581 3rd Generation Partnership Project (3GPP) vol. RAN WG1. Apr. 2, 2017. pp. 1-7 Retrieved from http://www.3gpp.org/ftp/Meetings_3GPP_SYNC/RAN1/Docs/.
(Continued)

*Primary Examiner* — Chi H Pham
*Assistant Examiner* — Fahmida S Chowdhury
(74) *Attorney, Agent, or Firm* — Huffman Law Group, PC; E. Alan Davis

(57) ABSTRACT

A wireless device receives a frequency division multiplexed (FDM) symbol of constituent equalized FDM data subcarriers. A modulation scheme constellation diagram is subdivided into two or more regions. For each of the regions, a subset of the subcarriers that fall within the region are extracted and a respective region-specific CPE estimate is computed thereon. The respective region-specific CPE estimates are averaged to produce an overall CPE estimate used to compensate the subcarriers. Furthermore, a first CPE estimate is computed using pilot symbols embedded in a first received FDM symbol and is used to compensate the subcarriers. A following second FDM symbol that has no embedded pilot symbols is compensated using the first CPE estimate, and a second CPE estimate is computed using a blind estimation method on the second FDM symbol com-
(Continued)

pensated subcarriers, which are compensated using the second CPE estimate.

21 Claims, 8 Drawing Sheets

(51) Int. Cl.
| | |
|---|---|
| H04L 27/26 | (2006.01) |
| H04L 25/02 | (2006.01) |
| H04J 11/00 | (2006.01) |
| H04L 27/38 | (2006.01) |
| H04L 25/03 | (2006.01) |
| H04L 5/00 | (2006.01) |

(52) U.S. Cl.
CPC .... *H04L 25/0224* (2013.01); *H04L 25/03159* (2013.01); *H04L 27/2627* (2013.01); *H04L 27/2657* (2013.01); *H04L 27/38* (2013.01); *H04J 2011/0009* (2013.01); *H04J 2011/0096* (2013.01); *H04L 5/0023* (2013.01); *H04L 5/0048* (2013.01); *H04L 27/2675* (2013.01); *H04L 27/2676* (2013.01); *H04L 2025/03414* (2013.01)

(56) References Cited

U.S. PATENT DOCUMENTS

| | | | |
|---|---|---|---|
| 9,191,161 | B2 | 11/2015 | Li et al. |
| 2005/0261028 | A1 | 11/2005 | Chitrapu |
| 2006/0182015 | A1* | 8/2006 | Kim ............... H04L 27/2657 370/203 |
| 2007/0206707 | A1* | 9/2007 | Chen ............ H04L 25/03057 375/320 |
| 2008/0279306 | A1 | 11/2008 | van Zelst et al. |
| 2014/0098689 | A1 | 4/2014 | Lee et al. |
| 2015/0326286 | A1 | 11/2015 | Wong et al. |
| 2015/0326291 | A1 | 11/2015 | Wong et al. |
| 2015/0326383 | A1 | 11/2015 | Wong et al. |
| 2016/0134352 | A1 | 5/2016 | Stirling-Gallacher |
| 2016/0337916 | A1 | 11/2016 | Deenoo et al. |
| 2017/0026938 | A1 | 1/2017 | Onggosanusi et al. |
| 2017/0207845 | A1 | 7/2017 | Moon et al. |
| 2017/0290013 | A1 | 10/2017 | McCoy et al. |
| 2017/0324459 | A1 | 11/2017 | Koskela et al. |
| 2017/0367046 | A1 | 12/2017 | Papasakellariou |
| 2018/0042028 | A1 | 2/2018 | Nam et al. |
| 2018/0097556 | A1 | 4/2018 | Nagaraja et al. |
| 2018/0123648 | A1 | 5/2018 | Nagaraja et al. |
| 2018/0227035 | A1 | 8/2018 | Cheng et al. |
| 2018/0227094 | A1 | 8/2018 | Liu et al. |
| 2018/0287759 | A1 | 10/2018 | Kundargi et al. |
| 2018/0317214 | A1 | 11/2018 | Ding et al. |
| 2018/0324678 | A1 | 11/2018 | Chen et al. |
| 2019/0052344 | A1 | 2/2019 | Kundargi et al. |
| 2019/0053072 | A1 | 2/2019 | Kundargi et al. |
| 2019/0074880 | A1 | 3/2019 | Frenne et al. |
| 2019/0090205 | A1 | 3/2019 | Gong et al. |
| 2019/0104549 | A1 | 4/2019 | Deng et al. |
| 2019/0132827 | A1 | 5/2019 | Kundargi et al. |
| 2019/0132828 | A1 | 5/2019 | Kundargi et al. |

OTHER PUBLICATIONS

CATT. "Details of Downlink Beam Management." R1-1704551 3rd Generation Partnership Project (3GPP) vol. RAN WG1. Apr. 2, 2017. pp. 1-8. Retrieved from http://www.3gpp.org/ftp/Meetings_3GPP_SYNC/RAN1/Docs/.
SAMSUNG."RRM Measurement in NR: The Details of Filtering." R2-1703721 3rd Generation Partnership Project (3GPP). vol. RAN WG2. Apr. 3, 2017. pp. 1- Retrieved from http://www.3gpp.org/ftp/Meetings_3GPP_SYNC/RAN2/Docs/.
White Paper. "802.11ad—WLAN at 60 GHz a Technology Introduction." Rohde & Schwarz 1MA220_2e. Nov. 17, 2017 pp. 1-28.
Serpedin, Erchin et al. "Performance Analysis of Blind Carrier Phase Estimators for General QAM Constellations." IEEE Transactions on Signal Processing, vol. 49, No. 8. Aug. 2001. pp. 1816-1823.
Moeneclaey, Marc et al. "ML-Oriented NDS Carrier Synchronization for General Rotationally Symmetric Signal Constellations." IEEE Transactions on Communications, vol. 42, No. 8, Aug. 1994. pp. 2531-2533.
Thomas, Timothy A. et al. "Blind Phase Noise Mitigation for a 72 GHz Millimeter Wave System." IEEE ICC 2015 SAC—Millimeter-wave Communications. 2015 pp. 1352-1357.
Vieira et al. "Reciprocity Calibration Methods for Massive MIMO Based on Antenna Coupling." Department of Electrical Engineering, Lund University, 5 pp. Jan. 1, 2014.
Harris, "University of Bristol and Lund University Partner with NI to Set World Records in 5G Wireless Spectral Efficiency Using Massive MIMO." 7 pp. May 2016.
"LTE in a Nutshell—Physical Layer." Telesystem Innovations Inc. White Paper. 18 pp. 2010.
"An Introduction to Orthogonal Frequency Division Multiplex Technology." Keithley Instruments, Inc. 66pp. 2008.
Huawei et al. "WF on CSI Acquisition in NR" 3GPP TSG RAB WGI Meeting #85, 4pp. May 27, 2016.
Huawei et al. "WF on CSI Acquisition Framework in NR." 3GPP TSG RAN WGI Meeting #85, 3pp. May 27, 2016.
"Study on Latency Reduction Techniques for LTE." 3GPP TR 36.881 Technical Report, 92pp. Feb. 2016.
"Study on Scenarios and Requirements for Next Generation Access Technologies." 3GPP TR 38.913 Technical Report, 19 pp. Feb. 2016.
Vieira et al. "A Fleixble 100-antenna Testbed for Massive MIMO." Department of Electrical and Information Technology at Lund University. 7pp. Jan. 1, 2014.
"Bristol and Lund set a New World Record in 5G Wireless Spectrum Efficiency." University of Bristol News. 6pp. Mar. 23, 2016.
"Study on NR New Radio Access Technology." 3GPP TSG RAN Meeting #71, 8pp. Mar. 2016.
Working Group Communication Architectures and Technologies. "LTE Small Cell Enhancement by Dual Connectivity." Wireless World Research Forum. 22pp. Nov. 2014.
White Paper. "LTE in a Nutshell: Protocol Architecture." Telesystem Innovations Inc. 12pp. 2010.
"LTE Random Access Procedure." EventHelix.com Inc., 5pp 2015.
Luther, "5G Massive MIMO Testbed: From Theory to Reality." National Instruments. Jun. 8, 2016. pp. 1-11.
"Introduction to the NI mmWave Transceiver System Hardware" National Instruments, Apr. 20, 2016. pp. 1-8.
"National Instruments Wireless Research Handbook" National Instruments, May 2016, pp. 1-37.
Shepard et al. "Argos: Practical Many-Antenna Base Stations" MobiCom 12, Aug. 22-26, 2012. Istanbul, Turkey. pp. 53-64.
Khoolenjani et al. "Distribution of the Ratio of Normal and Rice Random Variables" Digital Commons ®WayneState, Journal of Modern Applied Statistical Methods, vol. 12, Is 2, Article 27. Nov. 1, 2013. pp. 1-15.
Shen et al. "Channel Estimation in OFDM Systems" Freescale Semiconductor, Inc. Application Note, Jan. 2006, pp. 1-16.
"Final Report of 3GPP TSG RAN WG1 #88bis v1.0.0" MCC Support. 3GPP TSG RAN WG1 Meeting #89, Hangzhou, China. May 15-19, 2017. pp. 1-7. Downloaded from http://www.3gpp.org/ftp/tsg_ran/WG1_RL1/TSGR1_88b/Report/Final_Minutes_report_RAN1%2388b_v100.zip.
"Final Report of 3GPP TSG RAN WG1 #89 v1.0.0" MCC Support. 3GPP TSG RAN WG1 Meeting #90. Prague, Czech Rep. Aug. 21-25, 2017. pp. 1-8. Downloaded from http://www.3gpp.org/ftp/tsg_ran/WG1_RL1/TSGR1_89/Report/Final_Minutes_report_RAN1%2389_v100.zip.
"Final Report of 3GPP TSG RAN WG1 #AH_NR2 v1.0.0" MCC Support. 3GPP TSG RAN WG1 Meeting #90. Qingdao, China. Jun. 27-30, 2017. pp. 1-8. Downloaded from https://www.3gpp.org/ftp/

(56) References Cited

OTHER PUBLICATIONS tsg_ran/WG1_RL1/TSGR1_AH/NR_AH_1706/Report/Final_Minutes_report_RAN1%23AH_NR2_v100.zip.

"Discussion on Nested Usage of RS for Beam Measurement" National Instruments. 3GPP TSG RAN WG1 Meeting #89. Hangzhou, P.R. China May 15-19, 2017. pp.1-5 Downloaded from http://www.3gpp.org/ftp/tsg_ran/WG1_RL1/TSGR1_89/Docs/R1- 1708270.zip.

"On Remaining Aspects of Beam Recovery" National Instruments. 3GPP TSG RAN WG1 Meeting #90. Prague, Czech Republic, Aug. 21-25, 2017. pp. 1-10. Downloaded from http://www.3gpp.org/ftp/tsg_ran/WG1_RL1/TSGR1_90/Docs/R1- 1714180.zip.

"Study of Time a Frequency Density of UE-Specific & Cell-Specific Phase Noise RS with Different CPE Estimation Techniques." National Instruments, 3GPP TSG RAN WG1 NR Ad-Hoc Meeting, Spokane, WA, USA. Jan. 16-20, 2017. R1-1700854. pp. 1-12.

"Discussion on Signaling for PT-RS." National Instruments, 3GPP TSG RAN WG1 Meeting #88bis, Spokane, WA, USA. Apr. 3-7, 2017, R1-1705253. pp. 1-10.

Ng, Boon Loong. "5G NR mmWAVE Standards." Samsung Research America Keynote. Jul. 2017 pp. 1-10.

"Study on New Radio Access Technology Physical Layer Aspects." 3GPP A Global Initiative. 3rd Generation Partnership Project; Technical Specification Group Radio Access Network. 3GPP TR 38.802 V14.0.0. Mar. 2017. pp. 15-17.

"Beam Management Considerations for Above 6 GHz NR." MediaTek Inc. 3GPP TSG RAN WG1 Meeting #86, Gothenburg, Sweden. Aug. 22-26, 2016. R1-167543. pp. 1-4.

BPL Definition and Characteristics defined within an email between Zhangxi and Mihai Enescu. PDF downloaded on Mar. 22, 2018 from https://list.etsi.org/scripts/wa.exe?A3=ind1704A&L=3GPP_TSG_RAN_WG1_NR&E=base64&P=105463584&=---_000_HE1PR0701MB2074406F6853497D0CA128B996-D0HE1PR0701MB2074_&T—T=text%2Fhtml;%20charset=utf-8&pending=.

\* cited by examiner

FIG. 7
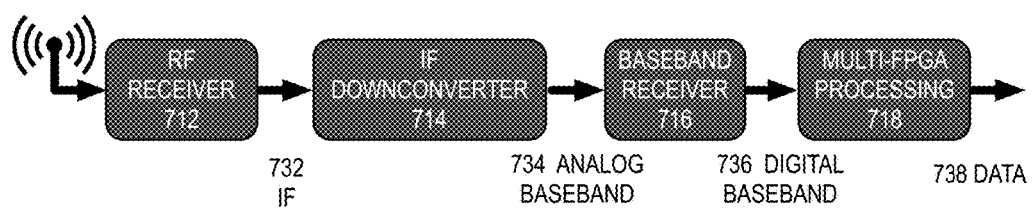
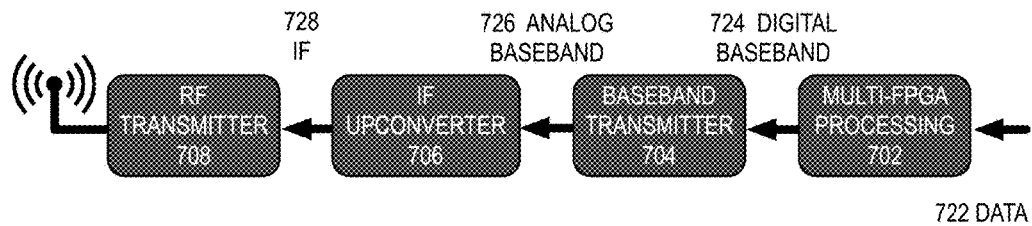

COMMON PHASE ERROR (CPE) COMPENSATION FOR FREQUENCY DIVISION MULTIPLEX (FDM) SYMBOLS IN WIRELESS COMMUNICATION SYSTEMS

CROSS REFERENCE TO RELATED APPLICATION(S)

This application claims priority based on U.S. Provisional Application, Ser. No. 62/443,226, filed Jan. 6, 2017, entitled BLIND COMMON PHASE ERROR (CPE) COMPENSATION FOR OFDM SYMBOLS IN WIRELESS COMMUNICATION SYSTEMS, which is hereby incorporated by reference in its entirety.

TECHNICAL FIELD

The disclosed embodiments relate to mobile telecommunications.

BACKGROUND

The New Radio (NR) definition in 3GPP ($3^{rd}$ Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. Flexible (scalable) frame structures are being considered for block symbol transmissions within the new 5G cellular communication standard including various frame structure parameters such as FFT (fast Fourier transform) size, sample rate, and subframe length.

FIG. 1 (Prior Art) provides a diagram of an example time-domain subframe structure 102 for the LTE (long term evolution) wireless cellular communication standard including a common subframe 102 and OFDM (orthogonal frequency division multiplex) symbols 208. For example, with respect to the 20 MHz (mega-Hertz) bandwidth LTE mode with a normal cyclic prefix and a sampling rate of 30.72 MSps (mega samples per second), one example subframe structure can be parameterized as follows:

OFDM symbol length: 2048 samples;
common cyclic prefix (CP) 114 length: 144 samples;
special cyclic prefix (CP) 112 length: 160 samples;
multiple OFDM symbols 108 (with CP); and
subframe length: 1 ms (millisecond) including 14 OFDM symbols (with CP).

One objective for the 5G air interfaces is to operate from below 1 GHz to 100 GHz carrier frequencies over a large variety of deployment scenarios in a single technical framework, for example, using OFDM (orthogonal frequency division multiplexing) modulation. For this objective, phase noise (PN) becomes a major impairment at carrier frequencies above about 6 GHz. Phase noise on an OFDM transmission includes two primary components: (1) common phase error (CPE) and (2) inter-carrier interference (ICI). CPE is a common phase rotation across all of the subcarriers for an OFDM transmission, and CPE manifests as a common rotation of the demodulated constellation. The phase noise at each subcarrier frequency also introduces ICI to the neighboring subcarriers, and this spectral leakage degrades the orthogonality of the OFDM waveform. This degradation is manifested as a "fuzziness" in each demodulated constellation point, and the level of ICI can be measured by the degradation of the EVM (Error Vector Magnitude) of the communication link. Phase noise typically increases with the carrier frequency, for example, one general assumption is that PSD (power spectrum density) associated with phase noise increases by about 20 dB per decade of frequency.

CPE can be estimated in a straightforward manner with a least squares estimator according to the equation shown below.

$$\hat{J}_0(m) = \frac{\sum_{k \in S_y} R_k(m) X_k^+(m) H_k^+(m)}{\sum_{k \in S_p} |X_k(m) H_k(m)|^2}.$$

For this equation, $R_k$ is the received subcarrier values; $X_k$ is the transmitted pilot symbol that is known at the receiver; $H_k$ is the channel estimate; $k \in S_p$; and $S_p$ is the subset of the subcarriers occupied by the pilot. The CPE for each OFDM symbol within an OFDM transmission is the DC component of the DFT (discrete Fourier transform) of the baseband PN (Phase Noise) samples over that symbol duration.

As CPE is constant for all subcarriers within an OFDM symbol and can be estimated, CPE compensation can be performed with the introduction of Phase Noise Reference Signals (PNRS) or pilot within the OFDM transmissions. The addition of the PNRS, therefore, allows for CPE compensation but only at the expense of additional pilot signal overhead within the OFDM symbols. This CPE estimation based on a static pilot pattern, therefore, has the drawback of high overhead due to required pilot signaling for the purely pilot aided PN compensation. Moreover, different devices and deployment scenarios have different levels of requirement for the PN (phase noise) mitigation. For example, UEs (user equipment) and base stations have significantly different phase noise PSD requirements, and UEs can be categorized into different groups with respect to PN performance based on their frequency band of operation and wireless system application, such as eMBB (enhanced Mobile Broad-Band), URLLC (ultra-reliable low latency communications), mMTC (massive machine type communications), and/or other use cases.

BRIEF SUMMARY

In one aspect, the present invention provides a wireless base station or user equipment that compensates a common phase error (CPE) in a received frequency division multiplexed (FDM) symbol, wherein the wireless base station or user equipment pre-processes the FDM symbol to obtain its constituent equalized FDM data subcarriers. The wireless base station or user equipment includes a constellation diagram subdivided into two or more regions, wherein the constellation diagram is associated with a modulation scheme used by a transmitter of another user equipment or base station to generate the FDM data subcarriers of the FDM symbol that was transmitted by the transmitter. An FDM symbol-based CPE estimator, for each region of the regions, extracts a subset of the equalized FDM data subcarriers that fall within the region and computes a respective region-specific CPE estimate on the subset of equalized FDM data subcarriers that fall within the region. The CPE estimator also averages the respective region-specific CPE estimates for the regions to produce an overall CPE estimate. A CPE compensator compensates each of the equalized FDM data subcarriers using the overall CPE estimate.

In another aspect, the present invention provides a method for compensation of a common phase error (CPE) in a frequency division multiplexed (FDM) symbol received by a wireless receiver, wherein the FDM symbol is pre-processed to obtain its constituent equalized FDM data subcarriers. The method includes subdividing a constellation diagram into two or more regions, wherein the constellation diagram is associated with a modulation scheme used by a transmitter to generate the FDM data subcarriers of the FDM symbol that was transmitted by the transmitter. The method further includes, for each region of the regions, extracting a subset of the equalized FDM data subcarriers that fall within the region and computing a respective region-specific CPE estimate on the subset of equalized FDM data subcarriers that fall within the region. The method further includes averaging the respective region-specific CPE estimates for the regions to produce an overall CPE estimate. The method further includes compensating each of the equalized FDM data subcarriers using the overall CPE estimate.

In yet another aspect, the present invention provides a wireless base station or user equipment that compensates a common phase error (CPE) in each of a series of received frequency division multiplexed (FDM) symbols, wherein the wireless base station or user equipment pre-processes the FDM symbols to obtain their constituent equalized FDM data subcarriers. The wireless base station or user equipment includes a receiver that receives a first FDM symbol in the series that has embedded pilot symbols, a CPE estimator that computes a first CPE estimate of the first FDM symbol using the pilot symbols, and a CPE compensator that compensates the equalized FDM data subcarriers of the first FDM symbol using the first CPE estimate. The receiver receives a second FDM symbol that follows the first FDM symbol in the series and that has no embedded pilot symbols. The CPE compensator compensates the equalized FDM data subcarriers of the second FDM symbol using the first CPE estimate. The CPE estimator computes a second CPE estimate of the second FDM symbol using a blind estimation method on the compensated equalized FDM data subcarriers of the second FDM symbol. The CPE compensator compensates the compensated equalized FDM data subcarriers of the second FDM symbol using the second CPE estimate.

In yet another aspect, the present invention provides a method for compensation of a common phase error (CPE) in each of a series of frequency division multiplexed (FDM) symbols received by a wireless receiver, wherein the FDM symbols are pre-processed by the receiver to obtain their constituent equalized FDM data subcarriers. The method includes receiving a first FDM symbol in the series that has embedded pilot symbols, computing a first CPE estimate of the first FDM symbol using the pilot symbols, compensating the equalized FDM data subcarriers of the first FDM symbol using the first CPE estimate, receiving a second FDM symbol that follows the first FDM symbol in the series and that has no embedded pilot symbols, compensating the equalized FDM data subcarriers of the second FDM symbol using the first CPE estimate, computing a second CPE estimate of the second FDM symbol using a blind estimation method on the compensated equalized FDM data subcarriers of the second FDM symbol, and compensating the compensated equalized FDM data subcarriers of the second FDM symbol using the second CPE estimate.

BRIEF DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

FIG. 7 is a block diagram of an example embodiment for a mm (millimeter) wave communication system that can use the disclosed blind CPE estimation techniques.

DETAILED DESCRIPTION

Figure 1:
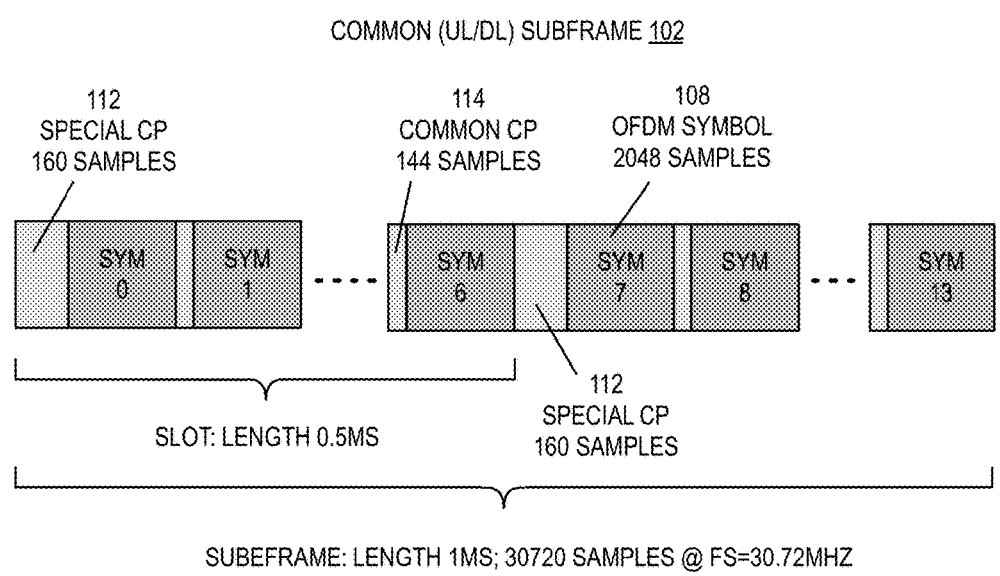
FIG. 1 (Prior Art) provides a diagram of an example time-domain subframe structure for the LTE (long term evolution) wireless cellular communication standard including a common subframe and OFDM (orthogonal frequency division multiplex) symbols.

The disclosed embodiments provide efficient techniques for common phase error (CPE) compensation for OFDM (orthogonal frequency division multiplexing) symbols in wireless communications using blind algorithms that may reduce pilot overhead while keeping the CPE compensation performance close to a pilot-only approach. The disclosed embodiments in part utilize blind phase noise estimation algorithms for CPE compensation, and disclosed blind CPE compensation techniques can be used in a variety of deployment scenarios including eMBB (enhanced Mobile Broad-Band), URLLC (ultra-reliable low latency communications), mMTC (massive machine type communications), and/or other use cases. The proposed blind CPE estimation algorithms do not suffer from the overhead of pilot-only CPE compensation. The disclosed methods and related systems are directed to FDM (frequency division multiplexing) modulation schemes where the full symbol is received before PN is estimated and compensated. Examples of FDM modulation schemes where the disclosed blind phase noise estimation techniques can be applied include OFDM, GFDM (generalized frequency division multiplexing), UFMC (universal filtered multi-carrier) with OFDM, f-OFDM (filtered orthogonal frequency division multiplexing), and/or other FDM modulation schemes.

For certain disclosed embodiments, methods and related systems are provided to estimate CPE with blind algorithms in the absence within the OFDM symbols of aiding pilots or reference signals for PN (phase noise) estimation. The CPE can be estimated, for example, based on averaging the phase of the I (real) and Q (imaginary) parts of the relevant OFDM subcarriers, based upon power law estimators for OFDM subcarriers, and/or other techniques. CPE compensation is then applied based upon the CPE estimate.

For certain disclosed embodiments, methods and related systems are provided to estimate CPE with a combination of blind and pilot aided algorithms where some symbols have a PN reference signal present and the rest of the symbols do not have a PN reference signal present. A pilot aided CPE estimation algorithm is used for those symbols where the PN reference signal is present, and a blind CPE estimation algorithm is performed for those symbols where the PN reference signal is absent. In addition, a blind CPE estimation algorithm can also be used where the PN reference signal is present. For these embodiments, therefore, a combination of blind and pilot aided CPE estimation is used for PN compensation.

For certain embodiments, methods and related systems are provided that adapt the density of the PN reference signals within the OFDM transmissions in a dynamic and/or semi-static manner based on the performance of the purely pilot aided CPE compensation method, blind CPE compensation method, and/or the pilot aided blind CPE compensation method. The density can be adapted in time and/or frequency. For example, the number of symbols within a duration including PN reference signals can be reduced as long as the pilot aided CPE compensation method continues to provide adequate performance. Once all PN reference signals are removed, the blind CPE compensation method can be used as long as it continues to provide adequate performance.

Figure 2:
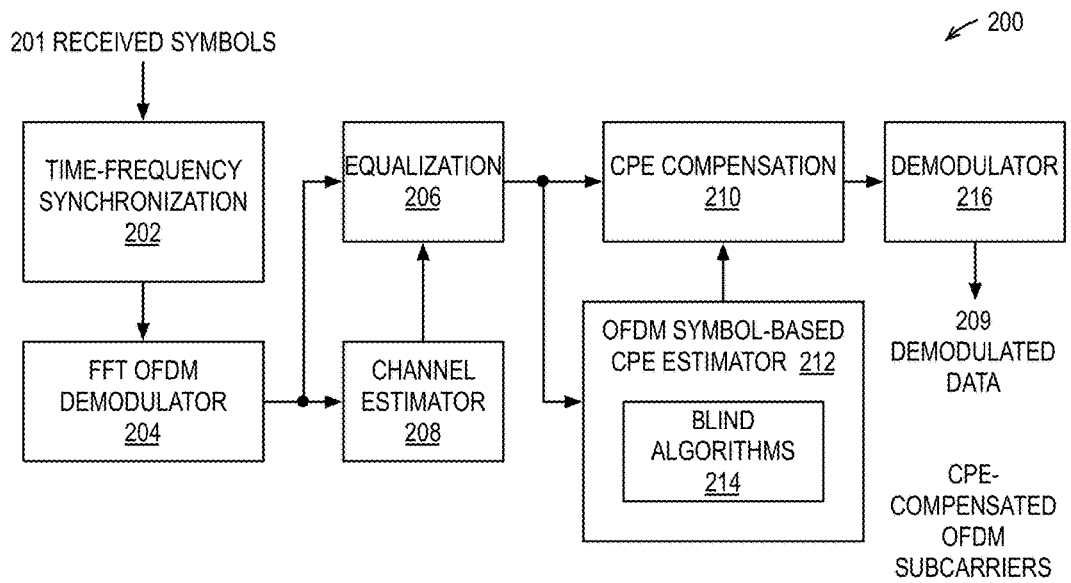
FIG. 2 is a block diagram of an example embodiment for symbol processing for OFDM transmissions including blind CPE estimation for CPE compensation.

Looking now to FIG. 2, a block diagram is provided of an example embodiment 200 for symbol processing for OFDM transmissions. A time-frequency synchronization processor 202 receives incoming symbols 201 from OFDM transmissions and aligns the start of each OFDM symbol 201 for the FFT (fast Fourier transform) operations. The FFT OFDM demodulator 204 receives the output of the time-frequency synchronization processor 202 and demodulates the OFDM symbol to extract subcarriers using an FFT operation. The channel estimator 208 receives the subcarriers and uses pilot information within the subcarriers to generate an estimate of the channel response. The equalization processor 206 receives the channel estimate from the channel estimator 208 and applies it to the extracted subcarriers from the OFDM demodulator 204 to generate equalized OFDM subcarriers. The CPE estimator 212 receives the equalized OFDM subcarriers and applies one or more blind algorithms 214 (e.g., pilot-aided blind method, blind-only method) to generate a CPE estimate, although pilot only estimation can also be applied. The CPE compensation processor 210 then receives the CPE estimate from the CPE estimator 212 and applies it to the equalized OFDM subcarriers to compensate for the CPE. The compensated OFDM subcarriers are then demodulated by the demodulator 216 to generate demodulated data 209. For example, this demodulation can produce a decision regarding which constellation point was transmitted within a modulation scheme (e.g., 16 QAM) applied to the transmitted symbols for processing.

Figure 3:
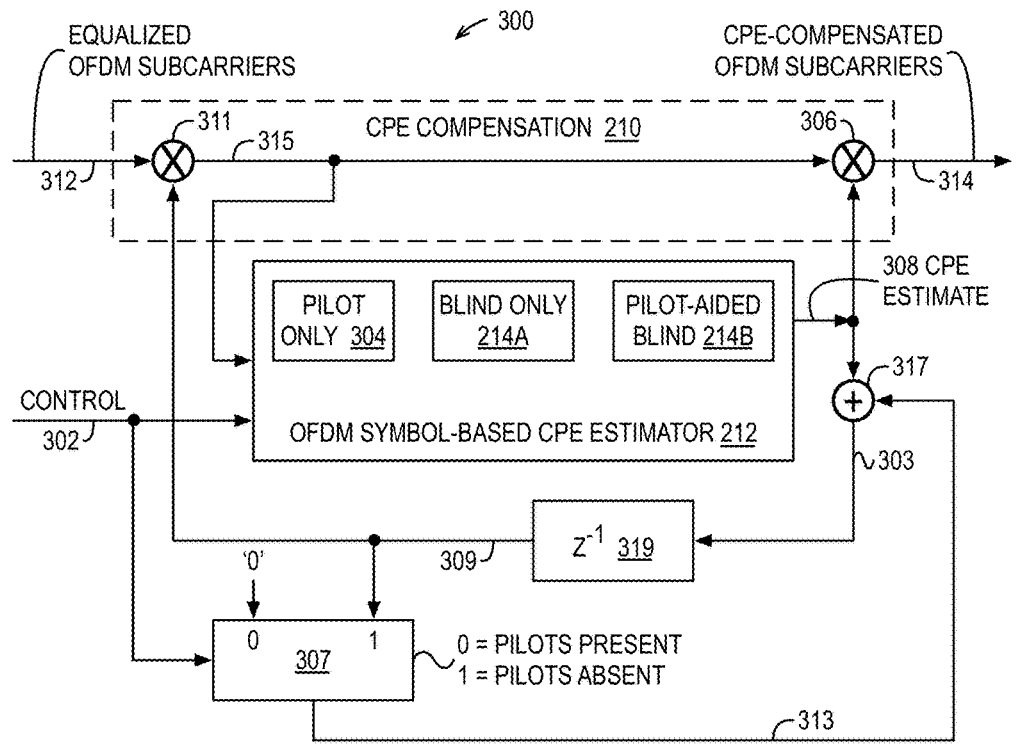
FIG. 3 is a block diagram of an example embodiment where the CPE estimator includes multiple estimation algorithms including a pilot only CPE estimation algorithm, a blind only CPE estimation algorithm, and a pilot aided blind CPE estimation algorithm.

FIG. 3 is a block diagram of an example embodiment 300 where the CPE estimator 212 includes multiple estimation algorithms including a pilot only CPE estimation algorithm 304, a blind only CPE estimation algorithm 214A, and a pilot aided blind CPE estimation algorithm 214B. The CPE estimator 212 receives a control signal 302 that determines which CPE estimation algorithm is applied to any particular OFDM symbol. This control signal 302, for example, can be generated by one or more control processors. For the embodiment, the CPE compensator 210 includes a digital mixer 306 that mixes the CPE estimate 308 from the CPE estimator 212 with a compensated, or de-rotated, version 315 of the equalized OFDM subcarriers 312 to generate the CPE compensated OFDM subcarriers 314. The CPE estimate 308 is provided to an accumulator 317 that accumulates the CPE estimate 308 with the output 313 of a selector 307 to produce an accumulated CPE estimate 303, which is provided to a delay block 319 that delays the accumulated CPE estimate 303 by one OFDM symbol. Thus, the delay block 319 produces an accumulated CPE estimate 309 associated with the previous OFDM symbol, whereas the accumulator 317 produces an accumulated CPE estimate 303 associated with the current OFDM symbol. The delayed accumulated CPE estimate 309 is provided to an input of the selector 307 and a zero value is provided to the other input of the selector 307. The control signal 302 controls the selector 307 to select the delayed CPE estimate 309 when the current OFDM symbol is absent pilot symbols for estimating CPE and selects the zero input when pilot symbols for estimating CPE are present, or embedded, in the current OFDM symbol, as well as when the system is at rest and in response to the receiver transitioning to the blind-only method 214A from the pilot-only method 304 or pilot-aided method 214B. The delayed accumulated CPE estimate 309 is also provided to a second mixer 311 that mixes the equalized subcarriers 312 of the current OFDM symbol to generate the compensated version 315 of the equalized OFDM subcarriers 312. The compensated version 315 of the equalized OFDM subcarriers 312 are also provided to the CPE estimator 212, which uses them to compute the CPE estimate 308. Preferably, the digital mixer 306 forms a unitary amplitude complex value having a phase, or offset angle, that is a negated version of the CPE estimate 308 and multiplies the compensated version of the equalized OFDM subcarriers 315 by the formed complex value to generate the CPE compensated OFDM subcarriers 314. Similarly, the second mixer 311 forms a unitary amplitude complex value having a phase, or offset angle, that is a negated version of the delayed accumulated CPE estimate 309 and multiplies the equalized OFDM subcarriers 312 by the formed complex value to generate the compensated version 315 of the equalized OFDM subcarriers 312. As described above, the CPE estimator 212 uses the de-rotated/compensated equalized subcarriers 315 to generate the CPE estimate 308. For example, in the case of an N-subcarrier FFT, the CPE estimator 212 uses N subcarriers to generate the CPE estimate 308, and the mixer 306 applies the CPE estimate 308 to the N subcarriers. It is noted that in the case of an OFDM symbol embedded with pilot symbols that are used to compute the CPE estimate 308, the mixer 311 will not modify the equalized OFDM subcarriers 312 (i.e., will mix them with a unitary value by operation of the selector 307 to output a zero-valued phase, or angle, that, as the exponent of the formed complex value, will cause it to be unitary).

It is again noted that the methods and related systems are provided that adapt the density of the PN reference signals or pilots within the OFDM transmissions in a dynamic and/or semi-static manner based on the performance of the purely pilot aided CPE compensation method 304, blind CPE compensation method 214A, and/or the pilot aided blind CPE compensation method 214B. This density of PN reference signals or pilots can be adapted in time and/or frequency. In addition, a receiving device (e.g., one or more UEs) can send control messages back to a transmitting device (e.g., one or more base stations) indicating the performance level associated with the CPE compensation methods being employed. For example, the number of symbols within a duration including PN reference signals or pilots can be reduced by the transmitting device as long as the pilot aided CPE compensation method continues to provide adequate performance. Once all PN reference signals are removed, the blind CPE compensation method 214A can be used as long as it continues to provide adequate performance. Other variations could also be implemented while still taking advantage of the blind CPE estimation techniques described herein.

Figure 4:
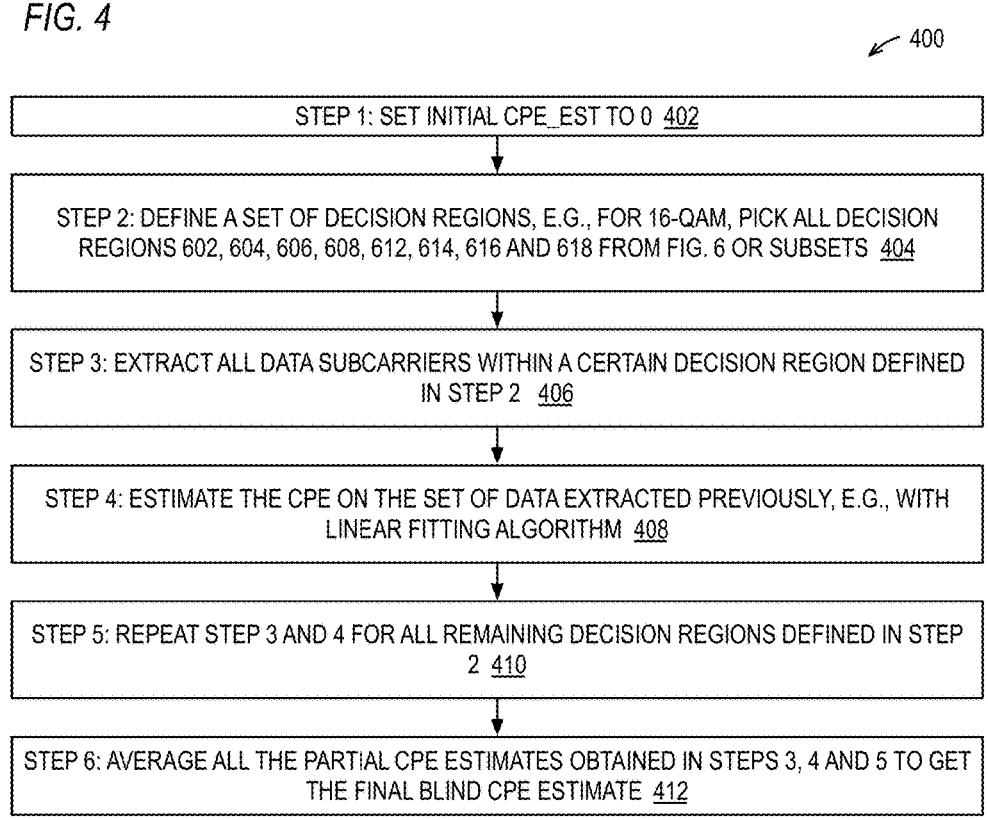
FIG. 4 is a process flow diagram of an example embodiment for a blind only CPE estimation algorithm for the CPE estimator.

FIG. 4 is a process flow diagram of an example embodiment 400 for a blind only CPE estimation algorithm for the CPE estimator 212. As a fully blind method, no pilots are necessary for embodiment 400 and no pilot overhead is required. For every symbol, the phase noise is estimated using a blind algorithm. It is noted that one or more of various PN estimators can be used for the blind CPE estimation. For the example embodiment 400, a threshold and average estimation method is used where received IQ points are thresholded and within each thresholding region, the phase of the I and Q components are averaged to derive the CPE estimate. A power law PN estimation method could also be used where received IQ points are raised to their Mth power, and the result is averaged and then post processed to derive the CPE estimate. Other blind PN estimation methods could also be used without requiring PN reference signals or other pilots to provide CPE estimation. An example of a fourth-power law estimation method that may be used in a QAM constellation that has quadrant symmetry (i.e., is symmetric with respect to phase $$\frac{\pi}{2},$$

e.g., square or cross-QAM constellations) is shown in equation (1) below.

$$\theta = \frac{1}{4}\text{angle}\left[E(X^{*4}(n))\frac{\sum_{n=1}^{N} Y^4(n)}{N}\right] \quad (1)$$

In equation (1), θ is the CPE estimate, E is the expectation operator, X(n) are the values of the known transmitted QAM constellation signal set, the * operator denotes the complex conjugate of the value (in this case, the subcarrier), Y(n) are the received subcarriers of the OFDM symbol, and N is the OFDM symbol size, i.e., the number of subcarriers.

Figure 6:
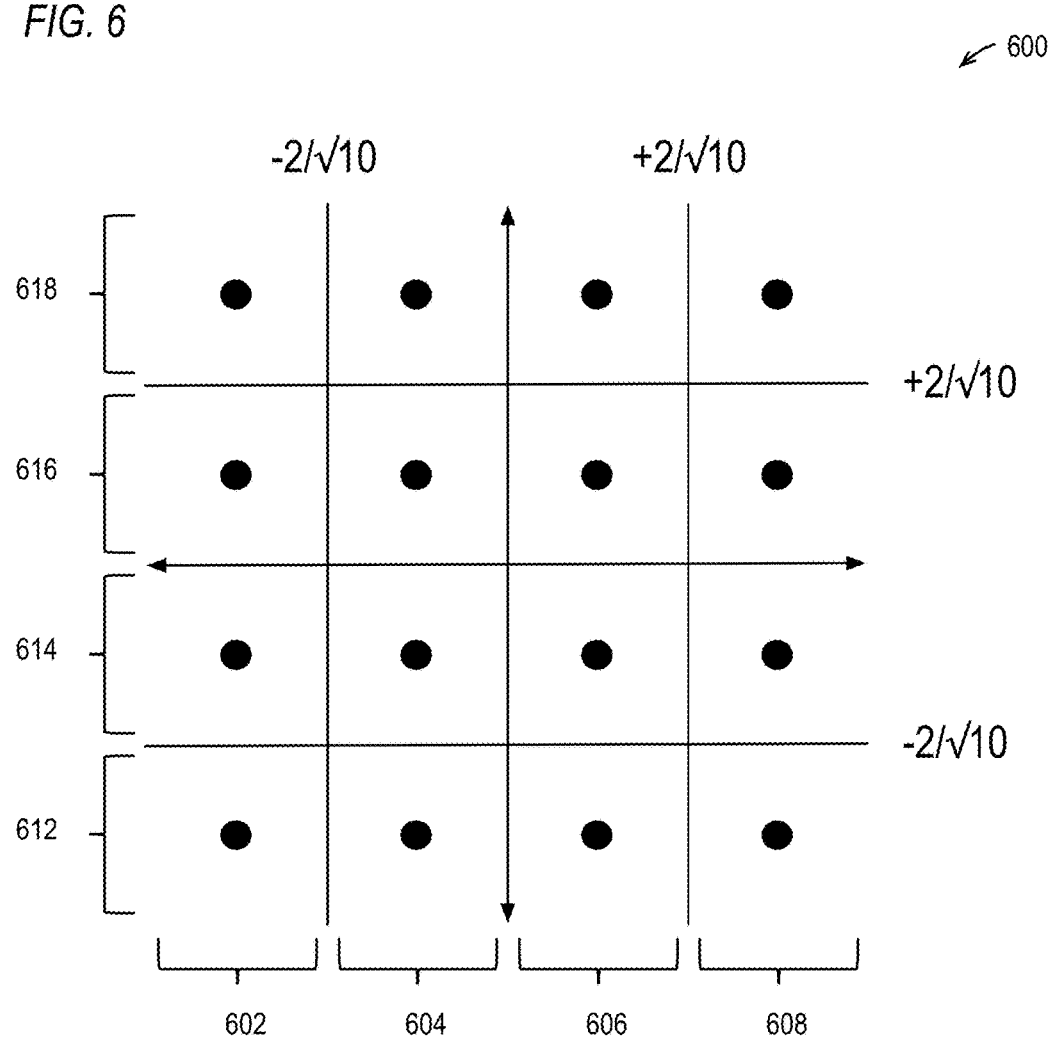
FIG. 6 is a diagram of an example embodiment for decision thresholds for the different 16-QAM threshold regions described with respect to FIG. 4.
Figure 10:
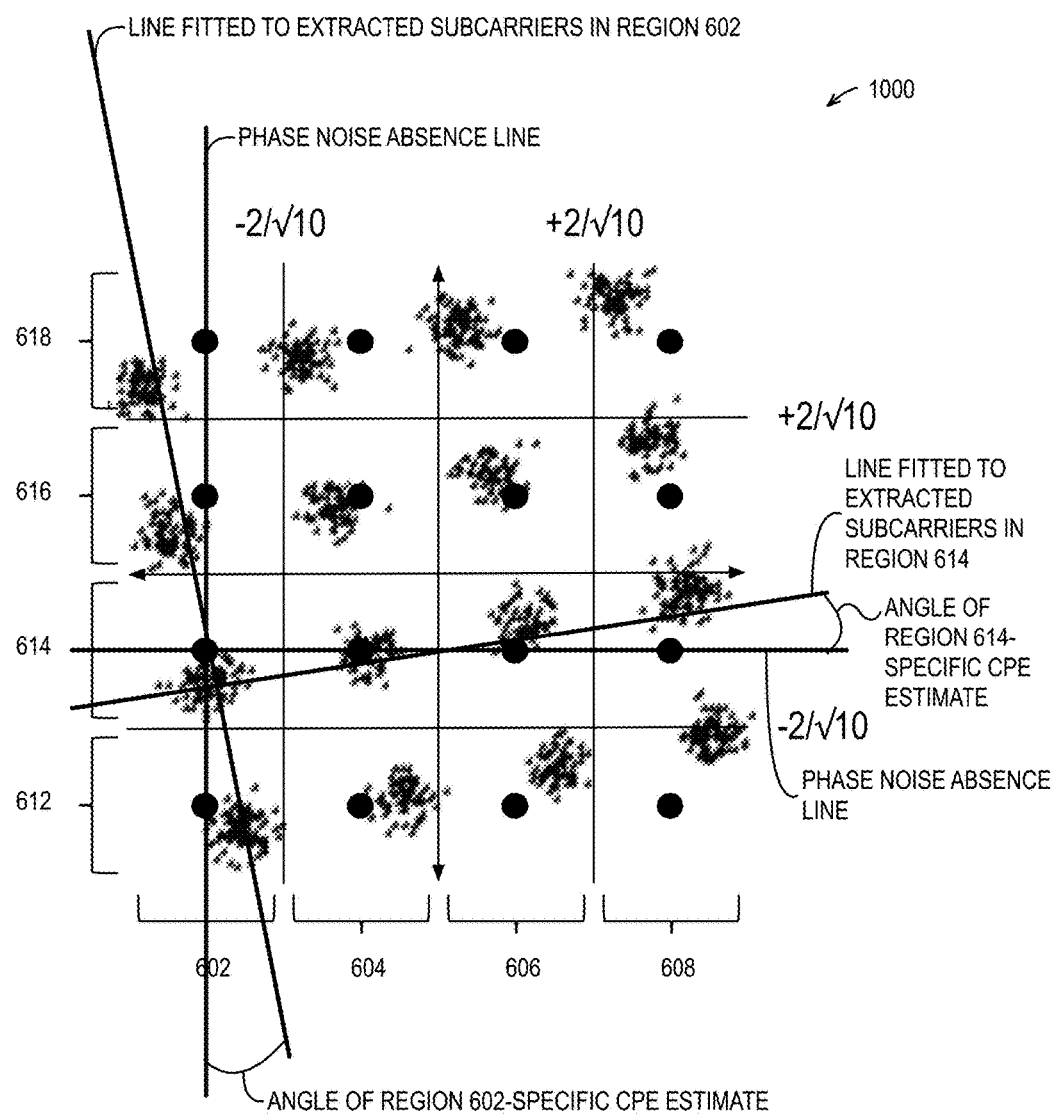
FIG. 10 is a diagram of an example embodiment employing the 8 decision thresholds for the different 16-QAM threshold regions of FIG. 6 and employing the embodiment of FIG. 4 method to extract subsets of data subcarriers of an OFDM symbol that fall within the 8 regions, i.e., the four real part regions and the four imaginary part regions.

Looking in more detail to FIG. 4, the initial CPE estimate is initially set to zero in block 402. In block 404 (STEP 2), a set of decision regions is defined. For example, a set of eight regions of a 16-QAM modulation constellation may be defined, as shown in FIG. 6 as 602, 604, 606, 608, 612, 614, 616 and 618, as described below in more detail. In block 406 (STEP 3), data is extracted for all data subcarriers within one of the regions defined in block 404 (STEP 2). For example, all the data subcarriers with a real (I) magnitude within region 602 may be extracted, e.g., I≤−2/sqrt(10), where "sqrt" is a square root function. In block 408 (STEP 4), the CPE is estimated on the set of data previously extracted in block 406 (STEP 3) to obtain a partial CPE estimate. For example, a linear fitting algorithm can be applied to the extracted data, as shown in FIG. 10. Examples of linear fitting schemes include least square estimation, maximum likelihood, Bayesian linear regression, and other linear fitting schemes. In block 410 (STEP 5), the processing in blocks 406 and 408 (STEPS 3 and 4) are repeated to cover all remaining regions defined in block 404 (STEP 2) to obtain a partial CPE estimate for each region. In block 412 (STEP 6), all the partial CPE estimates from the threshold regions obtained according to blocks 406, 408 and 410 (STEPS 3, 4 and 5) are combined, for example by averaging, to generate a final blind CPE estimate. As noted below, different threshold values and regions could also be used, and the number of threshold regions could also be adjusted.

Figure 5:
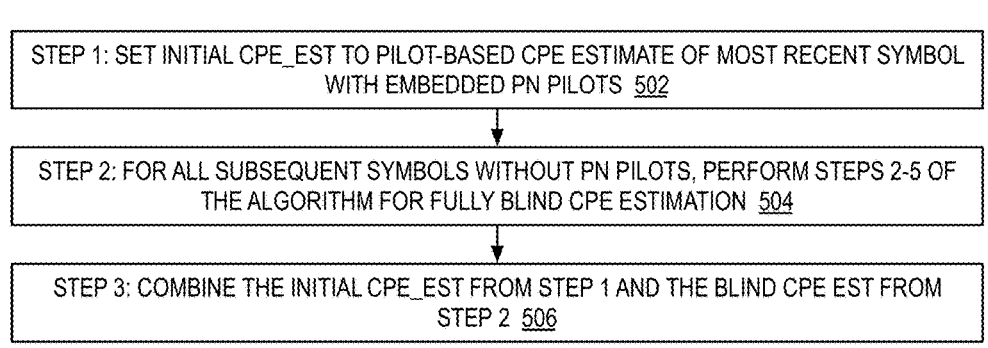
FIG. 5 is a process flow diagram of an example embodiment for a pilot aided blind CPE estimation algorithm for the CPE estimator.

FIG. 5 is a process flow diagram of an example embodiment 500 for a pilot aided blind CPE estimation algorithm for the CPE estimator 212. This embodiment provides a combination of the fully blind method above with traditional pilot aided CPE estimation methods. One traditional approach to reduce the PN pilot overhead for pilot aided CPE estimation is to have pilots only on intermittent symbols, for example on every second OFDM symbol. In embodiment 400, the pilot aided CPE estimate is started as the baseline. The blind estimator is then run on the symbols that do not have the pilots embedded in them.

Looking in more detail to FIG. 5, it is assumed that a traditional pilot only CPE estimation has already been run. In block 502 (STEP 1), the initial CPE estimate is set to the result of the pilot only based CPE estimate of the most recent symbol with an embedded PN reference signal or pilot. In block 504 (STEP 2), blocks 404, 406, 408, and 410 (STEPS 2-5) of embodiment 400 for fully blind CPE estimation are performed for all subsequent symbols without PN pilots. In block 506 (STEP 3), the initial pilot CPE estimate from block 502 (STEP 1) is combined with the blind CPE estimate from block 504 (STEP 2) to generate final pilot aided blind CPE estimate. The initial pilot CPE estimate may be combined with the blind CPE estimate by accumulating the two estimates and continuing to accumulate succeeding estimates, as shown in the embodiment of FIG. 3, for example.

FIG. 6 is a diagram of an example embodiment 600 for decision thresholds for the different 16-QAM threshold regions described above with respect to FIG. 4. The x-axis represents the real (I) magnitudes for the modulation scheme, and the y-axis represents the imaginary (Q) magnitudes for the modulation scheme. For the real (I) thresholds regions, region 602 includes values for I such that I≤−2/sqrt(10); region 604 includes values for I such that −2/sqrt(10)<I≤0; region 606 includes values for I such that 0<I≤2/sqrt(10); and region 608 includes values for I such that I>2/sqrt(10). For the imaginary (Q) thresholds regions, region 612 includes values for Q such that Q≤−2/sqrt(10); region 614 includes values for Q such that −2/sqrt(10)<Q≤0; region 616 includes values for Q such that 0<Q≤2/sqrt(10); and region 618 includes values for Q such that Q>2/sqrt(10). It is noted that different threshold values and regions could also be used, and the number of threshold regions could also be adjusted. For example, for 64-QAM modulation 16 different threshold regions could be used, and for QPSK modulation four different threshold regions could be used, respectively. Other variations could also be implemented while still taking advantage of the blind CPE estimation techniques described herein.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used for millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the blind CPE compensation techniques described herein for the disclosed embodiments. It is further noted that example wireless communication systems within which the disclosed blind CPE compensation techniques can be applied are also described in U.S. Published Patent Application No. 2015-0303936 (Ser. No. 14/257,944) and U.S. Published Patent Application No. 2015-0305029 (Ser. No. 14/691,339), each of which is hereby incorporated by reference in its entirety.

FIG. 7 is a block diagram of an example embodiment for a communication system 700 that can transmit and receive OFDM symbols as described herein. The example embodiment of FIG. 7 includes a transmit path and a receive path. The transmit path includes multi-FPGA processing circuitry 702, a baseband transmitter 704, an IF upconverter 706, and an RF transmitter 708. The receive path includes an RF receiver 712, an IF downconverter 714, a baseband receiver 716, and multi-FGPA processing circuitry 718. The transmit path and the receive path that are communicating with each other can be located in different devices (e.g., base station and user equipment for cellular communications). If bi-directional communications are desired, the different devices can each include a transmit path and a receive path. Other variations can also be implemented.

Looking to the transmit path, transmit data 722 is sent to multiple FPGAs 702 that provide multi-FPGA processing of the transmit data 722. The transmit data 722 can be generated by other processing circuitry such as a control processor or other circuitry. These FPGAs 702 can operate at a selected clock rate (e.g., 192 MS/s (mega samples per second) or other rate) and can use efficient parallel wide data path implementations, for example, with multiple (e.g. 16) data elements (e.g., baseband samples) per wide data path sample. The FPGAs 702 output digital baseband signals 724 to the baseband transmitter 704. The baseband transmitter 704 includes a digital-to-analog converter (DAC) that converts the digital baseband samples to analog baseband signals 726. The baseband transmitter 704 including the DAC can operate at a selected sampling rate (e.g., 3.072 GS/s (Giga samples per second) or other rate) and can receive digital baseband samples from one or multiple FPGAs 702 within the multi-FPGA processing circuitry. The analog baseband signals 726 are received by an IF (intermediate frequency) upconverter 706 that mixes the analog baseband signals 726 to higher frequency IF signals 728. These IF signals 728 are received by the RF transmitter 708 which further upconverts these signals to the frequency range of the desired transmissions.

Looking to the receive path, the receiver 712 receives the RF transmissions from the RF transmitter which can be within a desired frequency range. The RF receiver 712 downconverts these RF transmissions to lower frequency IF signals 732. The IF signals 732 are then received by an IF downconverter 714 that mixes the IF signals 732 down to analog baseband signals 734. The analog baseband signals 723 are then received by a baseband receiver 716. The baseband receiver 716 includes an analog-to-digital converter (ADC) that converts the analog baseband signals 734 to digital baseband signals 736. The baseband receiver 716 including the ADC can operate at a sampling rate (e.g., 3.072 GS/s (Giga samples per second) or other rate) and can send digital baseband samples 736 to one or multiple FPGAs within the multi-FPGA processing circuitry 718. The FPGAs 718 receive the digital baseband signals 736 and generate digital data that can be processed by additional processing circuitry such as a control processor or other circuitry. These FPGAs 718 can operate at a selected rate (e.g., 192 MS/s (mega samples per second) or other rate using efficient parallel wide data path implementations, for example, with multiple (e.g., 16) data elements (e.g., baseband samples) per wide data path sample.

Figure 8:
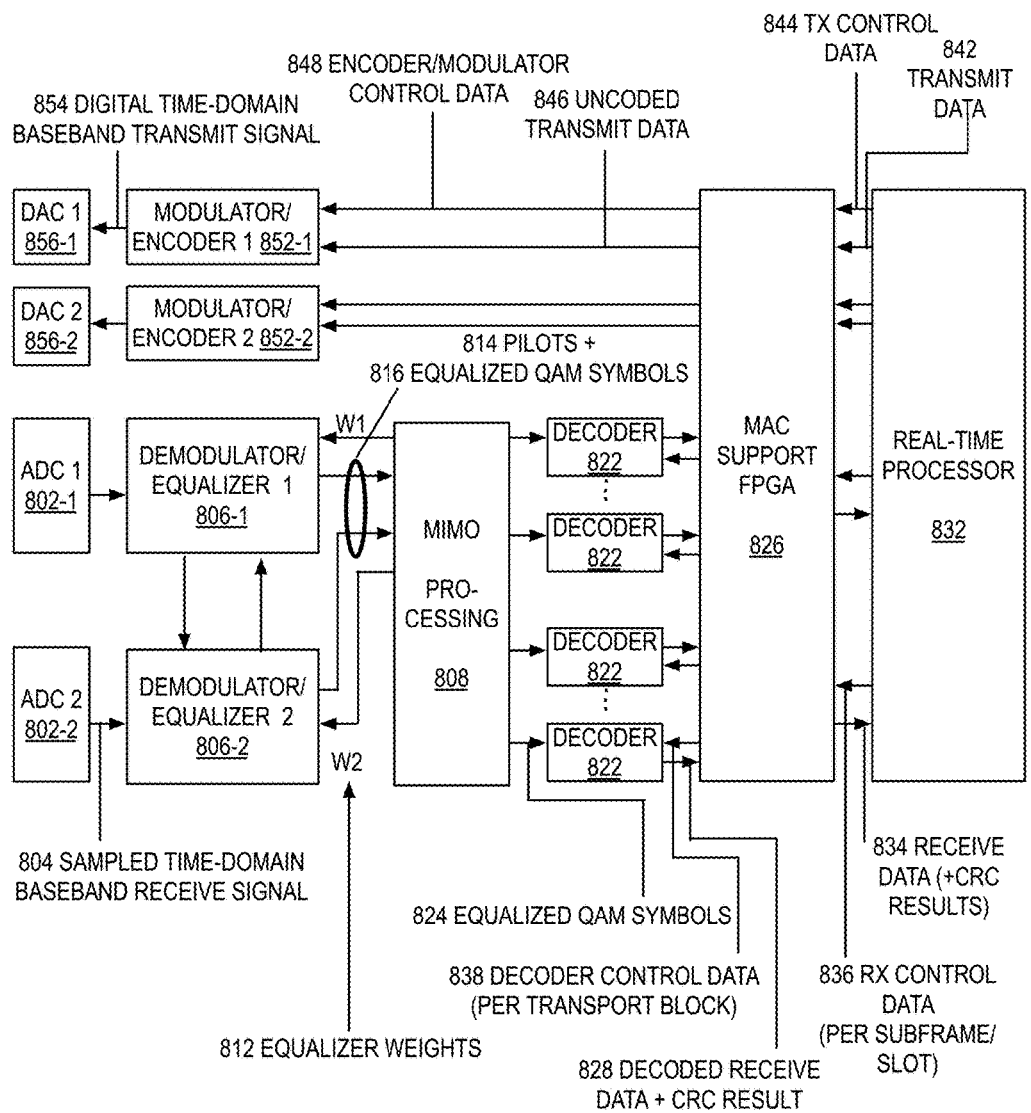
FIG. 8 is a block diagram of an example embodiment for circuitry that can be used to provide a baseband receiver, a baseband transmitter, multi-FPGA processing circuitry, and a real-time processor with respect to the embodiment of FIG. 7.

FIG. 8 is a block diagram of an example embodiment for circuitry that can be used to provide a baseband receiver, a baseband transmitter, multi-FPGA processing circuitry, and a real-time processor with respect to the embodiment of FIG. 7. The embodiment of FIG. 8 provides two receive/transmit streams and related processing circuitry.

Looking to the embodiment of FIG. 8, two analog-to-digital converters (ADC1 802-1, ADC2 802-2) receive analog baseband signals and output sampled digital baseband signals 804 (i.e., sampled time-domain baseband receive signals) to two demodulators/equalizers 806. The demodulators/equalizers (DEMODULATOR/EQUALIZER 1 806-1, DEMODULATOR/EQUALIZER 2 806-2) demodulate and equalize the respective receive signals. Due to the complexity of the MIMO (multiple input multiple output) equalization task, some parts of the related functionality are realized by a separate MIMO processing circuitry (MIMO PROCESSING 808). Specifically, this MIMO processing circuitry 808 performs the MIMO channel estimation and the calculation of the equalizer weights 812. For this, it uses the (pre-processed) pilot signals/symbols 814 extracted from both received baseband signals as input. These (pre-processed) pilot signals 814 are provided by the demodulators/equalizers 806. The equalizer weights 812 (W1, W2) calculated by the MIMO processing circuitry 808 are fed back to the demodulators/equalizers 806, which can perform the final MIMO equalization using these equalizer weights 812. To support this final MIMO equalization task, the demodulators/equalizers 806 can exchange intermediate equalization results. The final output of the demodulators/equalizers 806 are equalized QAM (quadrature amplitude modulation) symbols 816 for both receive streams. These equalized QAM symbols 816 are provided to the MIMO processing circuitry 808, which can distribute the equalized QAM symbols 824 to multiple decoders (DECODER 822). It is noted that the upper set of decoders 822 can be used for decoding the first receive stream and the lower set of decoders 822 can be used for decoding the second stream. The decoders 822 output decoded digital receive data 828 plus CRC (cyclic redundancy check) results per transport block to the MAC support FPGA 826. The MAC support FPGA 826 can collect the output data 828 of all decoders 822, can further process them, and can provide them to the real-time processor (REAL-TIME PROCESSOR 832) in a synchronized and consistent manner. The real-time processor 832 can perform further operations on the received data 828 (and CRC results) provided by the MAC support FPGA 826. Further, it can provide receiver (RX) control information 836 to the MAC support FPGA 826 and/or other receiver FPGAs (not shown) to control and configure the respective receivers. For example, the real-time controller 832 can provide the control data 836 for all decoders 822 per subframe to the MAC support FPGA 826, and the MAC support FPGA 826 can distribute these control data 838 to each decoder 822 to provide the configuration used to decode the related transport block. A similar functionality can be provided by the real-time processor 832 for the transmit paths. Uncoded digital transmit data 842 and related transmitter (TX) control data 844 are sent from the real-time processor 832 to the MAC support FPGA 826, which distributes the digital transmit data 846 as well as the respective encoder/modulator control data 848 to the two modulators/encoders (MODULATOR/ENCODER 1 852-1, MODULATOR/ENCODER 2 852-2). The modulators/encoders 852 encode the transmit data 846 and perform the transmit modulation, e.g., generate the digital time-domain baseband transmit signals 854. These digital time-domain baseband transmit signals 854 are sent by the modulators/encoders 852 to the digital-to-analog converters (DAC1 856-1, DAC2 856-2). The DACs 856 receive the digital baseband signals 854 and output analog baseband signals. It is noted that demodulators/equalizers, modulators/encoders, MIMO processing circuitry, and decoders can be implemented using multiple parallel FPGAs.

The disclosed embodiments can also be used for OFDM-based transmission schemes for massive MIMO cellular telecommunication systems as described in U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety. Such massive MIMO (multiple input, multiple output) communication systems can be used for 5G dynamic TDD (time division duplex) air interfaces. The 5G (5th generation) mobile telecommunications is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

Figure 9:
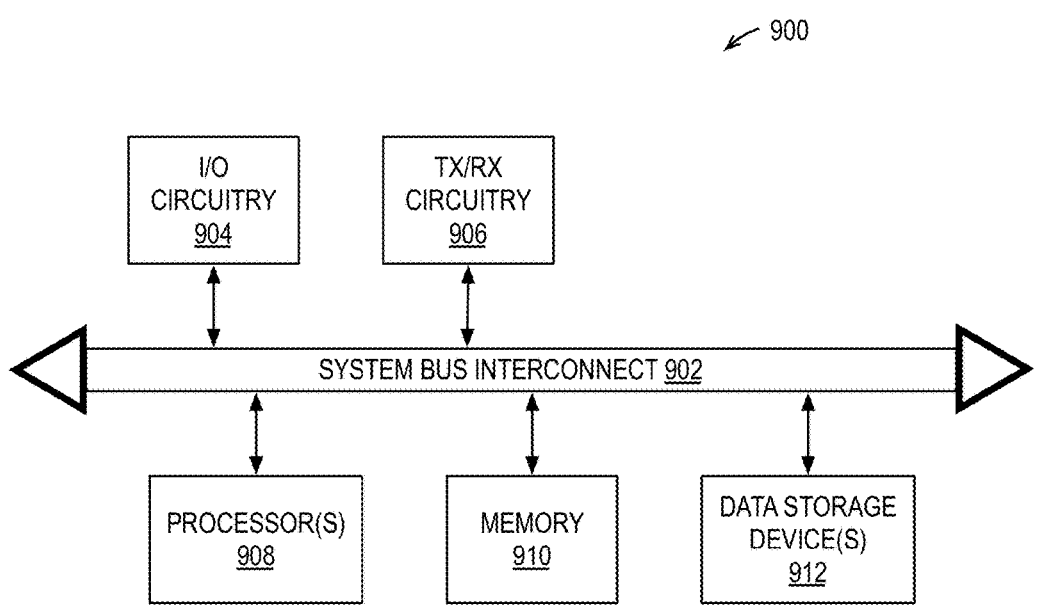
FIG. 9 is a diagram of an example embodiment for electronic components that can be used to implement a base station and/or user equipment (UE) including the CPE compensation and symbol processing described for the disclosed embodiments.

FIG. 9 is a diagram of an example embodiment 900 for electronic components that can be used to implement a base station and/or user equipment (UE) including the CPE compensation and symbol processing described for the disclosed embodiments. For the example embodiment 900 shown in FIG. 9, one or more processors 908 communicate with other components through system bus interconnect 902. For example, the one or more processors 908 communicate with input/output (I/O) circuitry 904 and transmit/receive (TX/RX) circuitry 906 through the system bus interconnect 902. Additional circuitry can also be included such as power supply circuitry and/or other desired circuitry. The TX/RX circuitry 906 provides one or more cellular radios and are preferably coupled to a plurality of antennas through which the TX/RX circuitry transmits and receives RF (radio frequency) signals (e.g., from a few kHz to 10 GHz and above). The I/O circuitry 904 provides one or more interfaces for users, such as graphical user interfaces, and/or connections to peripheral devices (e.g., displays, keyboards, mice, point device, and/or other I/O peripheral devices). The memory 910 is also coupled to the system bus interconnect 902 and can be used by the one or more processors 908 to load and/or store instructions, data, and/or other information during operation. One or more data storage device(s) 912 are also connected to the system bus interconnect 902 and can store software or program instructions and/or other desired data or information for the operation of the processing system. For example, computer-readable instructions stored in the data storage devices 912 can be loaded within the memory 910 and then executed by the processor(s) 908 to carry out the functions described herein.

FIG. 10 is a diagram of an example embodiment 1000 employing the 8 decision thresholds for the different 16-QAM threshold regions of FIG. 6 and employing the embodiment of FIG. 4 method to extract subsets of data subcarriers of an OFDM symbol that fall within the 8 regions, i.e., the four real part regions 602, 604, 606 and 608, and the four imaginary part regions 612, 614, 616 and 618. FIG. 10 further illustrates fitting a line to the extracted subcarriers that fall within region 602 (one of the four vertical real part regions) and computing the angle between the fitted line and a phase noise absence line (e.g., a vertical line) to obtain the region 602-specific CPE estimate. FIG. 10 further illustrates fitting a line to the extracted subcarriers that fall within region 614 (one of the four horizontal imaginary part regions) and computing the angle between the fitted line and a phase noise absence line (e.g., a horizontal line) to obtain the region 614-specific CPE estimate. Similar subcarrier extractions, line fitting, and CPE estimate calculations may be performed for additional regions, as necessary, and then the region-specific CPE estimates can be averaged to obtain a final, or overall, CPE estimate for the OFDM symbol, e.g., according to FIG. 4. As described above, the estimated angle may form the phase of a unitary amplitude complex number to be multiplied by each subcarrier of an OFDM symbol to accomplish compensation of the CPE in the OFDM symbol subcarriers. It is noted that the extracted subcarriers upon which the lines are fit are compensated/de-rotated subcarriers (e.g., output 315 of mixer 311 of FIG. 3), which may advantageously result in a more accurate CPE estimate 308 by decreasing the likelihood that the individual subcarriers will be extracted into the wrong region. As described above, advantageously the number of regions for which region-specific CPE estimates may be computed and averaged may vary based on available computing power and needed CPE compensation efficiency.

It is noted that different and/or additional components from those depicted in FIG. 9 could also be used to implement one or more radio systems for the embodiments described herein while still taking advantage of the blind CPE estimation techniques described herein. It is further noted that the system bus interconnect 902 can be implemented as multiple interconnection buses with our without additional intervening circuitry such as routing or switching circuitry. Further, the processor(s) 908 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the function described herein. Further, the one or more processor(s) 908 can execute instructions stored in a non-transitory tangible computer-readable medium to perform the functions described herein. In addition, data storage device(s) 912 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 910 can be any data storage medium configured to maintain data storage when powered. Other variations could also be implemented.

It is also noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the blind CPE estimation techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A wireless base station or user equipment that compensates a common phase error (CPE) in a received frequency division multiplexed (FDM) symbol, wherein the wireless base station or user equipment pre-processes the FDM symbol to obtain its constituent equalized FDM data subcarriers, comprising:
    a constellation diagram subdivided into two or more regions, wherein the constellation diagram is associated with a modulation scheme used by a transmitter of another user equipment or base station to generate the FDM data subcarriers of the FDM symbol that was transmitted by the transmitter;
    at least one processor that:
        for each region of the regions:
            extracts a subset of the equalized FDM data subcarriers that fall within the region; and
            computes a respective region-specific CPE estimate on the subset of equalized FDM data subcarriers that fall within the region; and averages the respective region-specific CPE estimates for the regions to produce an overall CPE estimate;

wherein the at least one processor compensates each of the equalized FDM data subcarriers using the overall CPE estimate; and wherein to compute a respective region-specific CPE estimate on the subset of equalized FDM data subcarriers that fall within the region, the at least one processor;

fits a line to the extracted subset of the equalized FDM data subcarriers that fall within the region; and computes an angle between the fitted line and a phase noise absence line associated with the region and assigns the respective region-specific CPE estimate with the computed angle.

2. The wireless base station or user equipment of claim 1, wherein the subdivided constellation diagram is subdivided into:

two or more vertical regions defined by one or more thresholds of complex FDM data subcarrier real component values; and/or two or more horizontal regions defined by one or more thresholds of complex FDM data subcarrier imaginary component values.

3. The wireless base station or user equipment of claim 1, further comprising:

wherein the at least one processor is configured to initialize an accumulated CPE estimate;

wherein the wireless base station or user equipment is configured to receive a series of the FDM symbols, wherein the FDM symbol of claim 1 is the first of the series;

for each FDM symbol of the FDM symbols in the series:

the at least one processor compensates the equalized FDM data subcarriers of the FDM symbol using the accumulated CPE estimate;

the at least one processor computes the overall CPE estimate of the FDM symbol;

the at least one processor compensates the compensated equalized FDM data subcarriers of the FDM symbol using the computed overall CPE estimate of the FDM symbol; and an accumulator updates the accumulated CPE estimate using the computed overall CPE estimate of the FDM symbol.

4. The wireless base station or user equipment of claim 3, wherein to initialize the accumulated CPE estimate, the at least one processor initializes the accumulated CPE estimate to zero.

5. The wireless base station or user equipment of claim 3, wherein to initialize the accumulated CPE estimate, the at least one processor initializes the accumulated CPE estimate to a CPE estimate computed using pilot symbols embedded in an FDM symbol preceding the series of FDM symbols.

6. The wireless base station or user equipment of claim 3, further comprising:

wherein the wireless base station or user equipment is configured to send, to the transmitter of the other wireless base station or user equipment, control messages that indicate a CPE compensation performance level to enable the other transmitter to adapt a density in time and/or frequency of embedded pilot symbols within subsequently transmitted FDM symbols in response to the control messages received from the receiver.

7. A method for compensation of a common phase error (CPE) in a frequency division multiplexed (FDM) symbol received by a wireless receiver, wherein the FDM symbol is pre-processed to obtain its constituent equalized FDM data subcarriers, the method comprising:

subdividing a constellation diagram into two or more regions, wherein the constellation diagram is associated with a modulation scheme used by a transmitter to generate the FDM data subcarriers of the FDM symbol that was transmitted by the transmitter;

for each region of the regions:

extracting a subset of the equalized FDM data subcarriers that fall within the region; and computing a respective region-specific CPE estimate on the subset of equalized FDM data subcarriers that fall within the region;

averaging the respective region-specific CPE estimates for the regions to produce an overall CPE estimate;

compensating each of the equalized FDM data subcarriers using the overall CPE estimate; and wherein said computing a respective region-specific CPE estimate on the subset of equalized FDM data subcarriers that fall within the region comprises:

fitting a line to the extracted subset of the equalized FDM data subcarriers that fall within the region; and computing an angle between the fitted line and a phase noise absence line associated with the region and assigning the respective region-specific CPE estimate with the computed angle.

8. The method of claim 7, further comprising:

wherein said subdividing a constellation diagram into regions comprises subdividing the constellation diagram into:

two or more vertical regions defined by one or more thresholds of complex FDM data subcarrier real component values; and/or two or more horizontal regions defined by one or more thresholds of complex FDM data subcarrier imaginary component values.

9. The method of claim 7, further comprising:

initializing an accumulated CPE estimate;

receiving a series of the FDM symbols, wherein the FDM symbol of claim 7 is the first of the series;

for each FDM symbol of the FDM symbols in the series:

compensating the equalized FDM data subcarriers of the FDM symbol using the accumulated CPE estimate;

computing the overall CPE estimate of the FDM symbol by said extracting and said computing a respective region-specific CPE estimate for each region of the regions, and said averaging the respective region-specific CPE estimates for the regions to produce an overall CPE estimate;

compensating the compensated equalized FDM data subcarriers of the FDM symbol using the computed overall CPE estimate of the FDM symbol; and updating the accumulated CPE estimate using the computed overall CPE estimate of the FDM symbol.

10. A wireless base station or user equipment that compensates a common phase error (CPE) in each of a series of received frequency division multiplexed (FDM) symbols, wherein the wireless base station or user equipment pre-processes the FDM symbols to obtain their constituent equalized FDM data subcarriers, comprising:

a receiver that receives a first FDM symbol in the series that has embedded pilot symbols;

at least one processor that computes a first CPE estimate of the first FDM symbol using the pilot symbols;

wherein the at least one processor compensates the equalized FDM data subcarriers of the first FDM symbol using the first CPE estimate;

wherein the receiver is further configured to receive a second FDM symbol that follows the first FDM symbol in the series and that has no embedded pilot symbols;

wherein the at least one processor is further configured to compensate the equalized FDM data subcarriers of the second FDM symbol using the first CPE estimate;

wherein the at least one processor is further configured to compute a second CPE estimate of the second FDM symbol using a blind estimation method on the compensated equalized FDM data subcarriers of the second FDM symbol;

wherein the at least one processor is further configured to compensate the compensated equalized FDM data subcarriers of the second FDM symbol using the second CPE estimate;

starting with a third FDM symbol (N=3) following the second FDM symbol (N=2) in the series, for each received Nth FDM symbol of the series, received by the receiver, that follows the N−1th FDM symbol in the series and that has no embedded pilot symbols:

the at least one processor compensates the equalized FDM data subcarriers of the Nth FDM symbol using an accumulation of the first through N−1th CPE estimates;

the at least one processor computes an Nth CPE estimate using the blind estimation method on the compensated equalized FDM data subcarriers of the Nth FDM symbol; and the at least one processor compensates the compensated equalized FDM data subcarriers of the Nth FDM symbol using the Nth CPE estimate;

wherein the receiver is further configured to receive an N+1th FDM symbol in the series that has embedded pilot symbols;

wherein the at least one processor is further configured to compute an N+1th CPE estimate using the embedded pilot symbols; and wherein the at least one processor is further configured to compensate the equalized FDM data subcarriers of the N+1th FDM symbol using the N+1th CPE estimate.

11. The wireless base station or user equipment of claim 10, wherein the wireless base station or user equipment is configured to send, to a transmitter of another wireless user equipment or base station, control messages that indicate a CPE compensation performance level to enable the other transmitter to adapt a density in time and/or frequency of embedded pilot symbols within subsequently transmitted FDM symbols in response to the received control messages.

12. The wireless base station or user equipment of claim 10, wherein to compute a second CPE estimate of the second FDM symbol using a blind estimation method on the compensated equalized FDM data subcarriers of the second FDM symbol, the at least one processor computes the second CPE estimate of the second FDM symbol using a power law method.

13. The wireless base station or user equipment of claim 10, wherein to compute a second CPE estimate of the second FDM symbol using a blind estimation method on the compensated equalized FDM data subcarriers of the second FDM symbol, the at least one processor computes the second CPE estimate of the second FDM symbol using a line fitting method.

14. The wireless base station or user equipment of claim 13, further comprising:

a constellation diagram subdivided into two or more regions, wherein the constellation diagram is associated with a modulation scheme used by a transmitter to generate the equalized FDM data subcarriers of the second FDM symbol that was transmitted by the transmitter; and wherein to compute a second CPE estimate of the second FDM symbol using a line fitting method:

for each region of the regions, the at least one processor:

extracts a subset of the equalized FDM data subcarriers that fall within the region; and computes a respective region-specific CPE estimate on the subset of equalized FDM data subcarriers that fall within the region; and the at least one processor averages the respective region-specific CPE estimates for the regions to produce an overall CPE estimate for the second FDM symbol.

15. A method for compensation of a common phase error (CPE) in each of a series of frequency division multiplexed (FDM) symbols received by a wireless receiver, wherein the FDM symbols are pre-processed by the receiver to obtain their constituent equalized FDM data subcarriers, the method comprising:

receiving a first FDM symbol in the series that has embedded pilot symbols;

computing a first CPE estimate of the first FDM symbol using the pilot symbols;

compensating the equalized FDM data subcarriers of the first FDM symbol using the first CPE estimate;

receiving a second FDM symbol that follows the first FDM symbol in the series and that has no embedded pilot symbols;

compensating the equalized FDM data subcarriers of the second FDM symbol using the first CPE estimate;

computing a second CPE estimate of the second FDM symbol using a blind estimation method on the compensated equalized FDM data subcarriers of the second FDM symbol;

compensating the compensated equalized FDM data subcarriers of the second FDM symbol using the second CPE estimate;

starting with a third FDM symbol (N=3) following the second FDM symbol (N=2) in the series, for each received Nth FDM symbol of the series that follows the N−1th FDM symbol in the series and that has no embedded pilot symbols:

compensating the equalized FDM data subcarriers of the Nth FDM symbol using an accumulation of the first through N−1th CPE estimates;

computing an Nth CPE estimate using the blind estimation method on the compensated equalized FDM data subcarriers of the Nth FDM symbol; and compensating the compensated equalized FDM data subcarriers of the Nth FDM symbol using the Nth CPE estimate;

receiving an N+1th FDM symbol in the series that has embedded pilot symbols;

computing an N+1th CPE estimate using the embedded pilot symbols; and compensating the equalized FDM data subcarriers of the N+1th FDM symbol using the N+1th CPE estimate.

16. The method of claim 15, further comprising:
wherein said computing a second CPE estimate of the second FDM symbol using a blind estimation method on the compensated equalized FDM data subcarriers of the second FDM symbol comprises computing the second CPE estimate of the second FDM symbol using a line fitting method;
wherein the line fitting method comprises:
subdividing a constellation diagram into two or more regions, wherein the constellation diagram is associated with a modulation scheme used by a transmitter to generate the equalized FDM data subcarriers of the second FDM symbol that was transmitted by the transmitter;
for each region of the regions:
extracting a subset of the equalized FDM data subcarriers that fall within the region; and
computing a respective region-specific CPE estimate on the subset of equalized FDM data subcarriers that fall within the region;
averaging the respective region-specific CPE estimates for the regions to produce an overall CPE estimate for the second FDM symbol.

17. A wireless base station or user equipment that compensates a common phase error (CPE) in a received frequency division multiplexed (FDM) symbol, wherein the wireless base station or user equipment pre-processes the FDM symbol to obtain its constituent equalized FDM data subcarriers, comprising:
a constellation diagram subdivided into two or more regions, wherein the constellation diagram is associated with a modulation scheme used by a transmitter of another user equipment or base station to generate the FDM data subcarriers of the FDM symbol that was transmitted by the transmitter;
at least one processor that:
for each region of the regions:
extracts a subset of the equalized FDM data subcarriers that fall within the region; and
computes a respective region-specific CPE estimate on the subset of equalized FDM data subcarriers that fall within the region; and
averages the respective region-specific CPE estimates for the regions to produce an overall CPE estimate;
wherein the at least one processor compensates each of the equalized FDM data subcarriers using the overall CPE estimate;
wherein the at least one processor is configured to initialize an accumulated CPE estimate;
wherein the wireless base station or user equipment is configured to receive a series of the FDM symbols, wherein the FDM symbol of claim 1 is the first of the series; and
for each FDM symbol of the FDM symbols in the series:
the at least one processor compensates the equalized FDM data subcarriers of the FDM symbol using the accumulated CPE estimate;
the at least one processor computes the overall CPE estimate of the FDM symbol;
the at least one processor compensates the compensated equalized FDM data subcarriers of the FDM symbol using the computed overall CPE estimate of the FDM symbol; and
an accumulator updates the accumulated CPE estimate using the computed overall CPE estimate of the FDM symbol.

18. A wireless base station or user equipment that compensates a common phase error (CPE) in a received frequency division multiplexed (FDM) symbol, wherein the wireless base station or user equipment pre-processes the FDM symbol to obtain its constituent equalized FDM data subcarriers, comprising:
a constellation diagram subdivided into two or more regions, wherein the constellation diagram is associated with a modulation scheme used by a transmitter of another user equipment or base station to generate the FDM data subcarriers of the FDM symbol that was transmitted by the transmitter;
at least one processor that:
for each region of the regions:
extracts a subset of the equalized FDM data subcarriers that fall within the region; and
computes a respective region-specific CPE estimate on the subset of equalized FDM data subcarriers that fall within the region; and
averages the respective region-specific CPE estimates for the regions to produce an overall CPE estimate;
wherein the at least one processor compensates each of the equalized FDM data subcarriers using the overall CPE estimate; and
wherein the wireless base station or user equipment is configured to send, to the transmitter of the other wireless base station or user equipment, control messages that indicate a CPE compensation performance level to enable the other transmitter to adapt a density in time and/or frequency of embedded pilot symbols within subsequently transmitted FDM symbols in response to the control messages received from the receiver.

19. A method for compensation of a common phase error (CPE) in a frequency division multiplexed (FDM) symbol received by a wireless receiver, wherein the FDM symbol is pre-processed to obtain its constituent equalized FDM data subcarriers, the method comprising:
subdividing a constellation diagram into two or more regions, wherein the constellation diagram is associated with a modulation scheme used by a transmitter to generate the FDM data subcarriers of the FDM symbol that was transmitted by the transmitter;
for each region of the regions:
extracting a subset of the equalized FDM data subcarriers that fall within the region; and
computing a respective region-specific CPE estimate on the subset of equalized FDM data subcarriers that fall within the region;
averaging the respective region-specific CPE estimates for the regions to produce an overall CPE estimate;
compensating each of the equalized FDM data subcarriers using the overall CPE estimate;
initializing an accumulated CPE estimate;
receiving a series of the FDM symbols, wherein the FDM symbol of claim 7 is the first of the series; and
for each FDM symbol of the FDM symbols in the series:
compensating the equalized FDM data subcarriers of the FDM symbol using the accumulated CPE estimate;
computing the overall CPE estimate of the FDM symbol by said extracting and said computing a respective region-specific CPE estimate for each region of the regions, and said averaging the respective region-specific CPE estimates for the regions to produce an overall CPE estimate;

compensating the compensated equalized FDM data subcarriers of the FDM symbol using the computed overall CPE estimate of the FDM symbol; and updating the accumulated CPE estimate using the computed overall CPE estimate of the FDM symbol.

20. A wireless base station or user equipment that compensates a common phase error (CPE) in each of a series of received frequency division multiplexed (FDM) symbols, wherein the wireless base station or user equipment preprocesses the FDM symbols to obtain their constituent equalized FDM data subcarriers, comprising:

a receiver that receives a first FDM symbol in the series that has embedded pilot symbols;

at least one processor that computes a first CPE estimate of the first FDM symbol using the pilot symbols;

wherein the at least one processor compensates the equalized FDM data subcarriers of the first FDM symbol using the first CPE estimate;

wherein the receiver is further configured to receive a second FDM symbol that follows the first FDM symbol in the series and that has no embedded pilot symbols;

wherein the at least one processor is further configured to compensate the equalized FDM data subcarriers of the second FDM symbol using the first CPE estimate;

wherein the at least one processor is further configured to compute a second CPE estimate of the second FDM symbol using a blind estimation method on the compensated equalized FDM data subcarriers of the second FDM symbol;

wherein the at least one processor is further configured to compensate the compensated equalized FDM data subcarriers of the second FDM symbol using the second CPE estimate; and wherein the wireless base station or user equipment is configured to send, to a transmitter of another wireless user equipment or base station, control messages that indicate a CPE compensation performance level to enable the other transmitter to adapt a density in time and/or frequency of embedded pilot symbols within subsequently transmitted FDM symbols in response to the received control messages.

21. A wireless base station or user equipment that compensates a common phase error (CPE) in each of a series of received frequency division multiplexed (FDM) symbols, wherein the wireless base station or user equipment preprocesses the FDM symbols to obtain their constituent equalized FDM data subcarriers, comprising:

a receiver that receives a first FDM symbol in the series that has embedded pilot symbols;

at least one processor that computes a first CPE estimate of the first FDM symbol using the pilot symbols;

wherein the at least one processor compensates the equalized FDM data subcarriers of the first FDM symbol using the first CPE estimate;

wherein the receiver is further configured to receive a second FDM symbol that follows the first FDM symbol in the series and that has no embedded pilot symbols;

wherein the at least one processor is further configured to compensate the equalized FDM data subcarriers of the second FDM symbol using the first CPE estimate;

wherein the at least one processor is further configured to compute a second CPE estimate of the second FDM symbol using a blind estimation method on the compensated equalized FDM data subcarriers of the second FDM symbol;

wherein the at least one processor is further configured to compensate the compensated equalized FDM data subcarriers of the second FDM symbol using the second CPE estimate; and wherein to compute a second CPE estimate of the second FDM symbol using a blind estimation method on the compensated equalized FDM data subcarriers of the second FDM symbol, the at least one processor computes the second CPE estimate of the second FDM symbol using a power law method.

* * * * *